Patented Aug. 31, 1926.

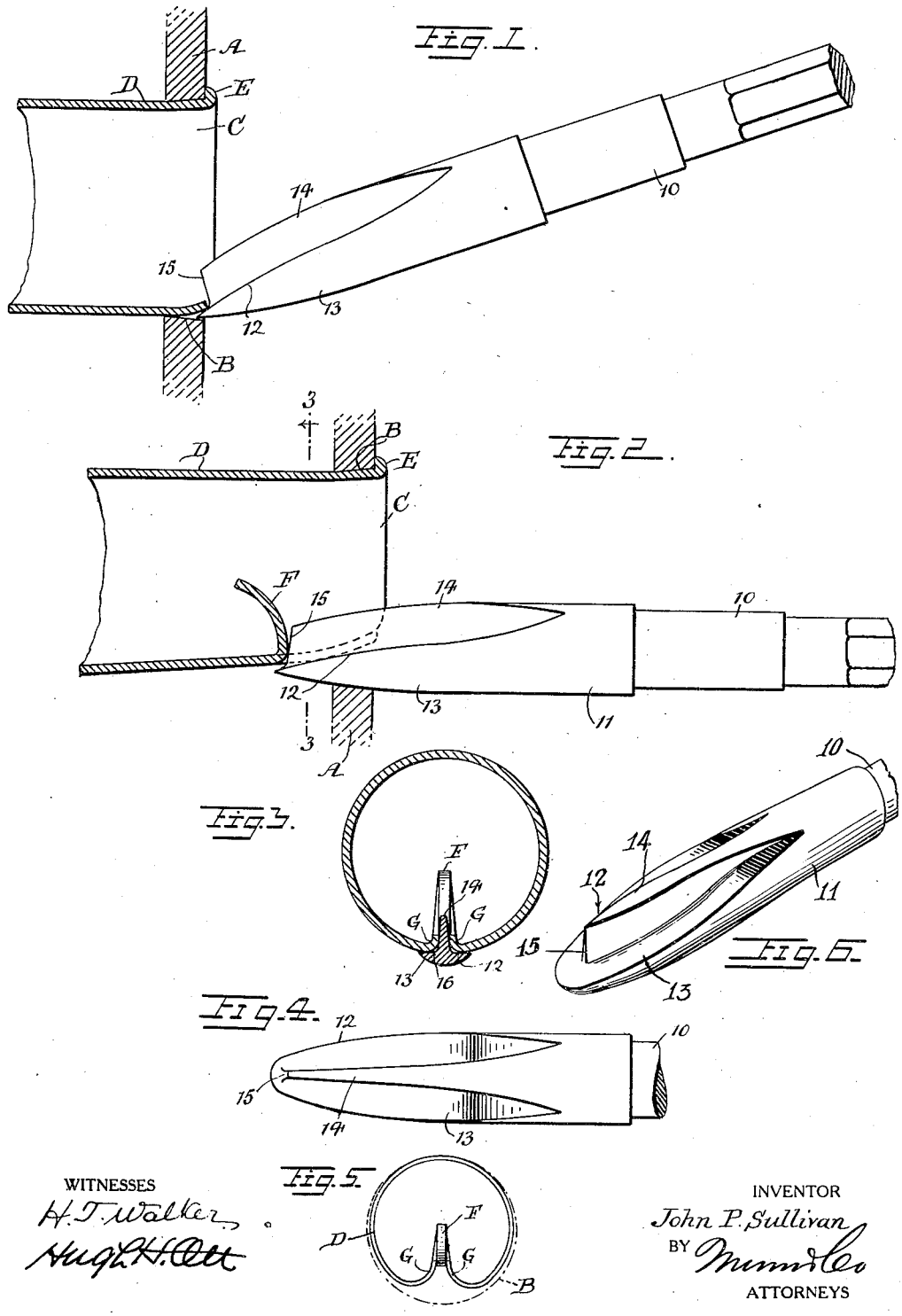

1,598,458

UNITED STATES PATENT OFFICE.

JOHN P. SULLIVAN, OF NEW YORK, N. Y.

TOOL FOR REMOVING BOILER TUBES.

Application filed December 12, 1924. Serial No. 755,583.

This invention relates to tools and has particular reference to a tool for facilitating the removal of tubes from boilers where the ends of the tubes are expanded and beaded in the openings in the crown sheets.

In removing tubes from a boiler, where the ends of the tubes have been expanded in the openings in the crown sheet and formed with an external bead, it is the general practice at the present time to cut the tube at a point inside of the expanded portion, then remove the expanded and beaded portions and finally fish out the remaining section of the tube. It is of course obvious that this practice entails untold time and labor and is consequently a costly and expensive operation.

It is therefore an object of the present invention to provide a tool which reduces to a minimum the time, labor and expense of removal of the tubes by the accomplishment of said removal in a more facile manner.

More specifically the invention contemplates a boiler tube removing tool which functions to rip a longitudinal strip from the expanded and beaded ends of the tubes thus compensating for the contraction of the expanded end of the tube by means of the tool to allow for withdrawal of the same through the opening in the crown sheet.

The invention furthermore comprehends a tool of the character set forth which is comparatively simple in its construction and mode of use, inexpensive to manufacture and which is highly effective in its purpose.

With the above recited and other objects in view, the invention resides in the novel construction set forth in the following specification, particularly pointed out in the appended claims and illustrated in the accompanying drawings, it being understood that the right is reserved to embodiments other than those actually illustrated herein, to the full extent indicated by the general meaning of the terms in which the claims are expressed.

In the drawings—

Figure 1 is a fragmentary sectional view through a crown sheet and boiler tube illustrating the initial insertion of the tool.

Fig. 2 is a similar view illustrating the ripping and contracting action of the boiler tube by means of the tool.

Fig. 3 is a transverse sectional view taken approximately on the line indicated at 3—3 in Fig. 2.

Fig. 4 is a plan view of the tool.

Fig. 5 is a diagrammatic end view of the tube illustrating the contraction of the expanded end in the crown sheet opening.

Figure 6 is a perspective view of the head of the tool.

Referring to the drawings by characters of reference A designates the crown sheet of a boiler provided with the boiler tube receiving openings B within which the ends C of the boiler tube B are expanded and formed with an external bead E.

The tool embodying the present invention and constituting an improved means for contracting the expanded ends and facilitating the removal of the tube comprises a shank 10 which if desired may be associated with a pneumatically operated tool holder or other machine or manually operated. At one end the shank is provided with a head 11 having a beveled upper face 12 and a lower arcuate surface 13 of gradually increasing diameter from its free forward end toward the juncture of its rear end with the shank and forming with the beveled face a sharp edge. The head further includes an integral rib 14 projecting at a right angle from the upper beveled face of the head, said rib having a blunt forward end 15 disposed slightly in rear of the forward sharpened edge of the head and said rib being further of gradually increasing widths from its forward to its rear end. At the juncture of the base of the rib with the beveled face, the same is curved outwardly as at 16 and merges into the inner face of the head. Under this arrangement the head serves in the capacity of what is generally known in the art as an "oyster knife" while the rib functions as a ripper.

In use and operation of the tool when it is desired to remove a tube from the opening in the crown sheet of a boiler, a portion of the bead E is removed to permit of the insertion of the forward sharp edge of the head between the expanded end of the tube D and the wall of the opening B as clearly illustrated in Fig. 1. The hammering blows on the opposite end of the shank 10 will gradually work the head between the wall of the opening and the boiler tube and the blunt end of the rib will longitudinally rip a strip from the tube as indicated at F in Fig. 2. At the same time the edges of the tube defined by the ripped-away portion F engaging with the beveled faces of the head and rib will effect an inward curling of the edges G and consequently a contraction of the expanded portion of the tube so that the diameter of said expanded portion is contracted to a diameter less than the diameter of the opening B. The curled-up edges G may then be gripped by a suitable tool for effecting the removal of the tube through the opening B.

From the foregoing it will thus be seen that an extremely simple yet highly efficient tool has been devised for the purpose specified which tool functions to facilitate the removal of boiler tubes from a boiler.

I claim:

1. A tool for facilitating the removal of boiler tubes, comprising a body having a beveled upper face, a curved lower surface, and a rib on the beveled upper face, said tool being adapted to be driven between the end of a tube and the wall of the opening in the crown sheet of a boiler to cause a longitudinal strip to be ripped from the tube by the rib, and the edges of the tube defined by the ripped strip adapted to move up the beveled face to curl the said edges and thereby contract the end of the tube.

2. A tool for facilitating the removal of boiler tubes comprising a shank and a head at one end thereof having a beveled upper face and an arcuate lower surface of gradually increasing diameter from its forward free end to the juncture of its rear end with the shank and forming with the beveled face a sharp edge, and a right angularly defined rib on the upper beveled face of the head, said rib having a blunt forward end disposed slightly in rear of the forward sharpened edge of the head and of gradually increasing width from its forward to its rear end, whereby the end of the tube can be ripped and its edges curled to contract said end.

3. A tool for facilitating the removal of boiler tubes comprising a shank and a head at one end thereof having a beveled upper face and an arcuate lower surface of gradually increasing diameter from its forward free end to the juncture of its rear end with the shank and forming with the beveled face a sharp edge, and a right angularly disposed rib on the upper beveled face, said rib having a blunt forward end disposed slightly in rear of the forward sharpened edge of the head, and of gradually increasing width from its forward to its rear end, the base of said rib at its juncture with the head being curved outwardly and merging into the upper beveled face of said head.

4. A tool for facilitating the removal of boiler tubes, comprising a shank and a head at one end thereof having a beveled upper face and an arcuate lower surface of gradually increasing diameter from its forward free end to the juncture of its rear end with the shank and forming with the beveled face a sharp edge, and a right angularly disposed rib on the upper beveled face of the head, said rib having a blunt forward end disposed slightly in rear of the forward sharpened edge of the head and of gradually increasing width from its forward to its rear end, the base of said rib at its juncture with the head being curved outwardly and merging into the beveled face of the head, the forward sharpened edge of the head being adapted to be driven between the portion of the tube expanded in the crown sheet opening of a boiler and the crown sheet, the blunt forward end of the rib being adapted to rip a longitudinal strip from the tube whereby the edges of the tube defined by the ripped away strip engage the beveled face of the head and the curved opposite sides of the base of the rib for effecting the inward curling of the edges of the tube and the contraction of the expanded portion of the tube.

JOHN P. SULLIVAN.